Sept. 1, 1925.  
O. G. SIMMONS  
1,551,705

APPARATUS FOR GENERATING CONVOLUTE LINES IN HOBBING CUTTERS, SCREWS, AND WORMS

Filed July 29, 1921 — 6 Sheets-Sheet 1

INVENTOR:  
Oliver G. Simmons  
BY Cornelius D. Ehret  
his ATTORNEY.

Sept. 1, 1925.                                              1,551,705
                         O. G. SIMMONS
APPARATUS FOR GENERATING CONVOLUTE LINES IN HOBBING CUTTERS, SCREWS, AND WORMS
                    Filed July 29, 1921        6 Sheets-Sheet 2
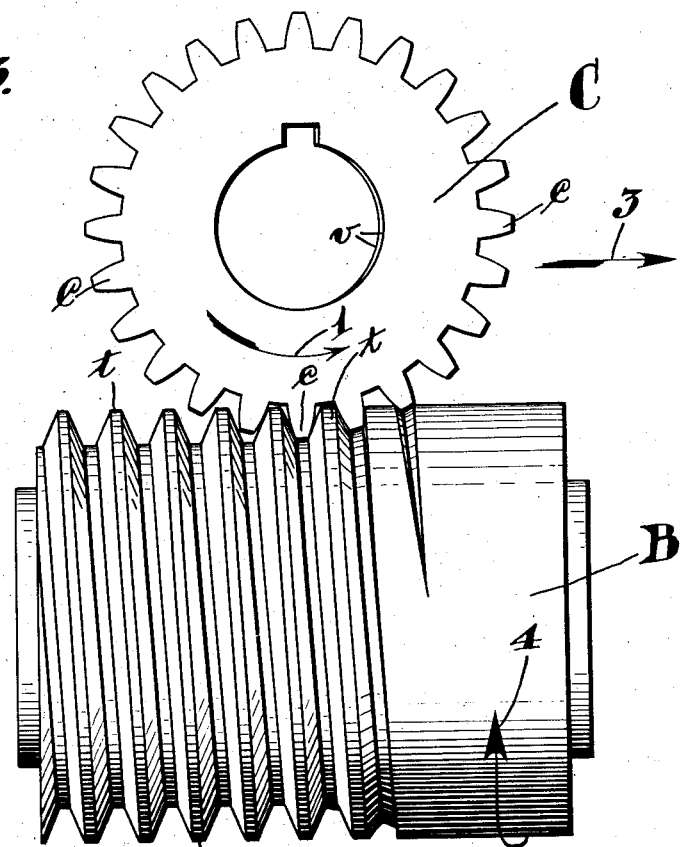
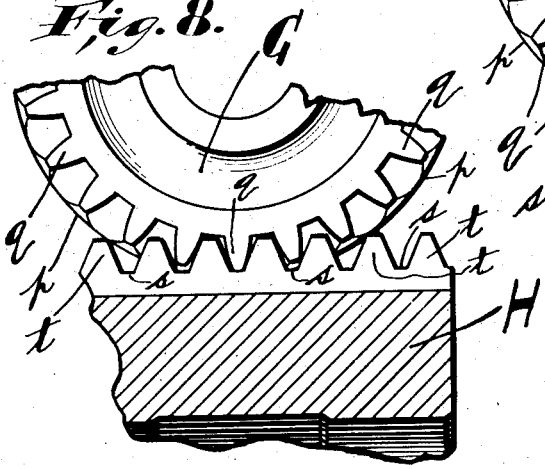
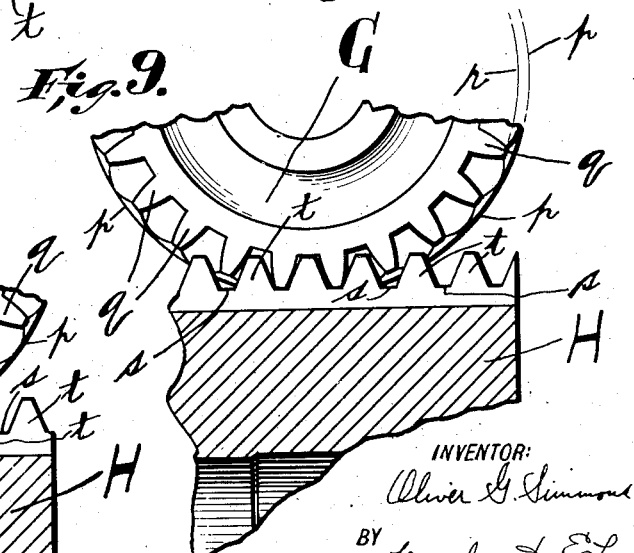

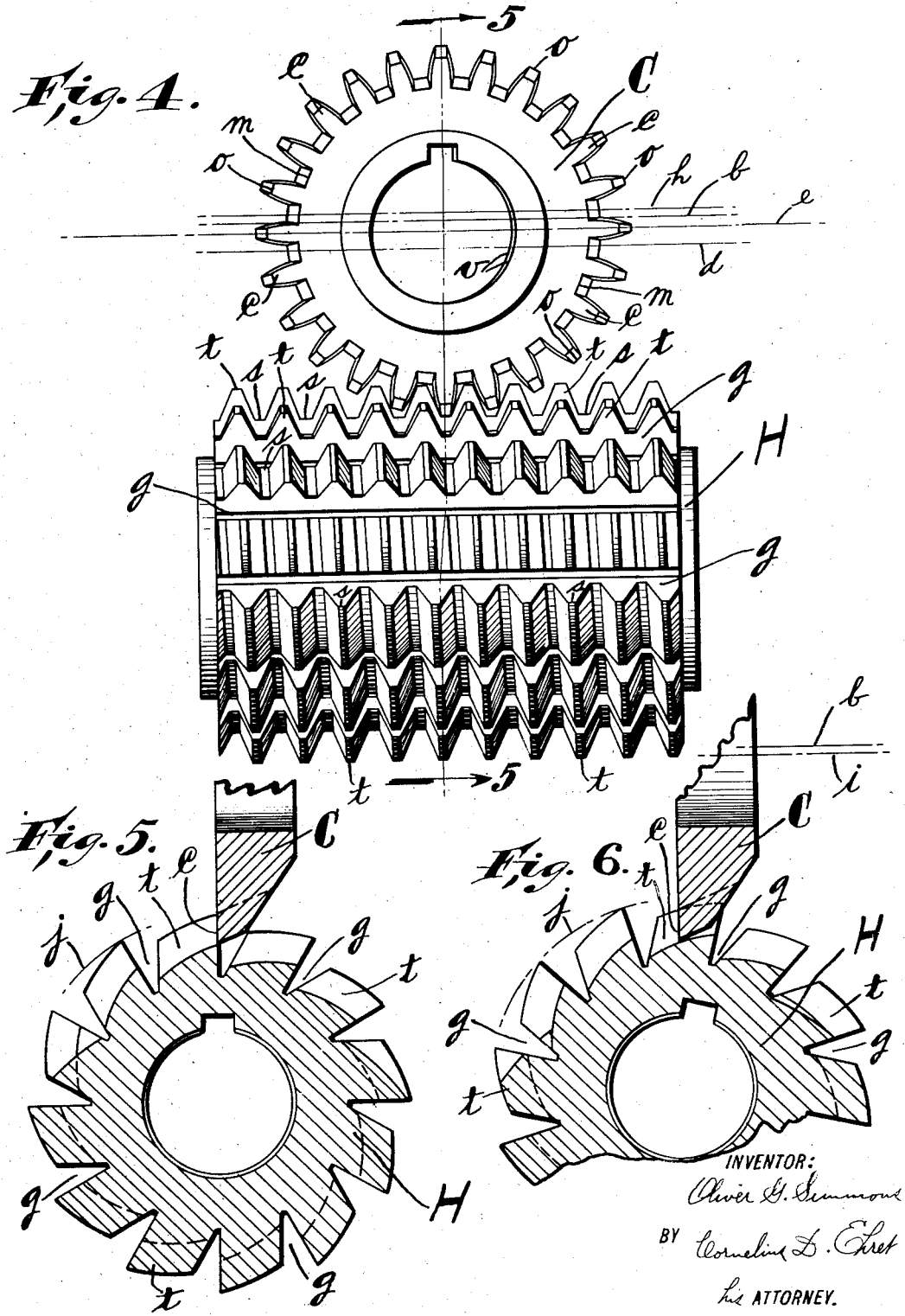

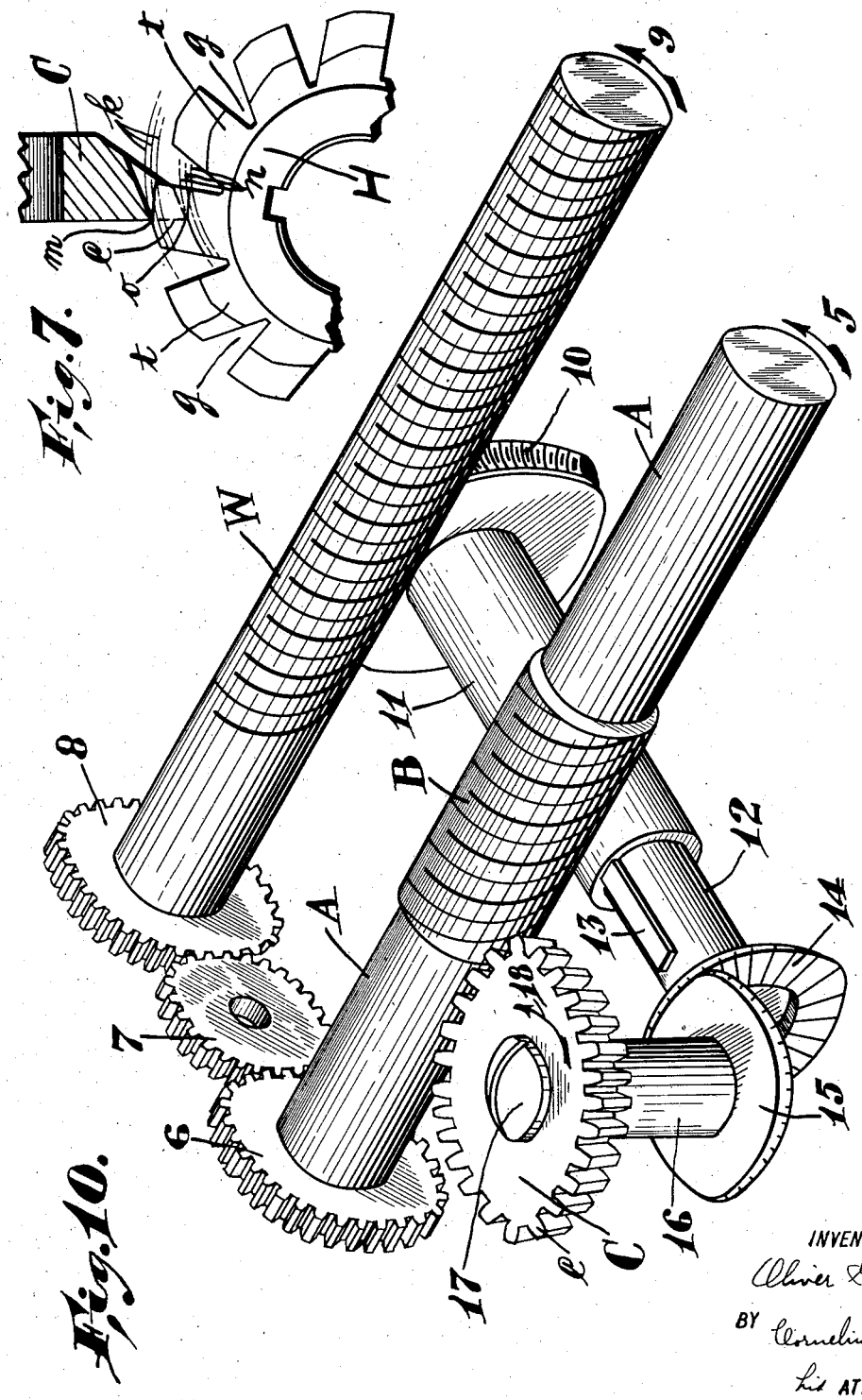

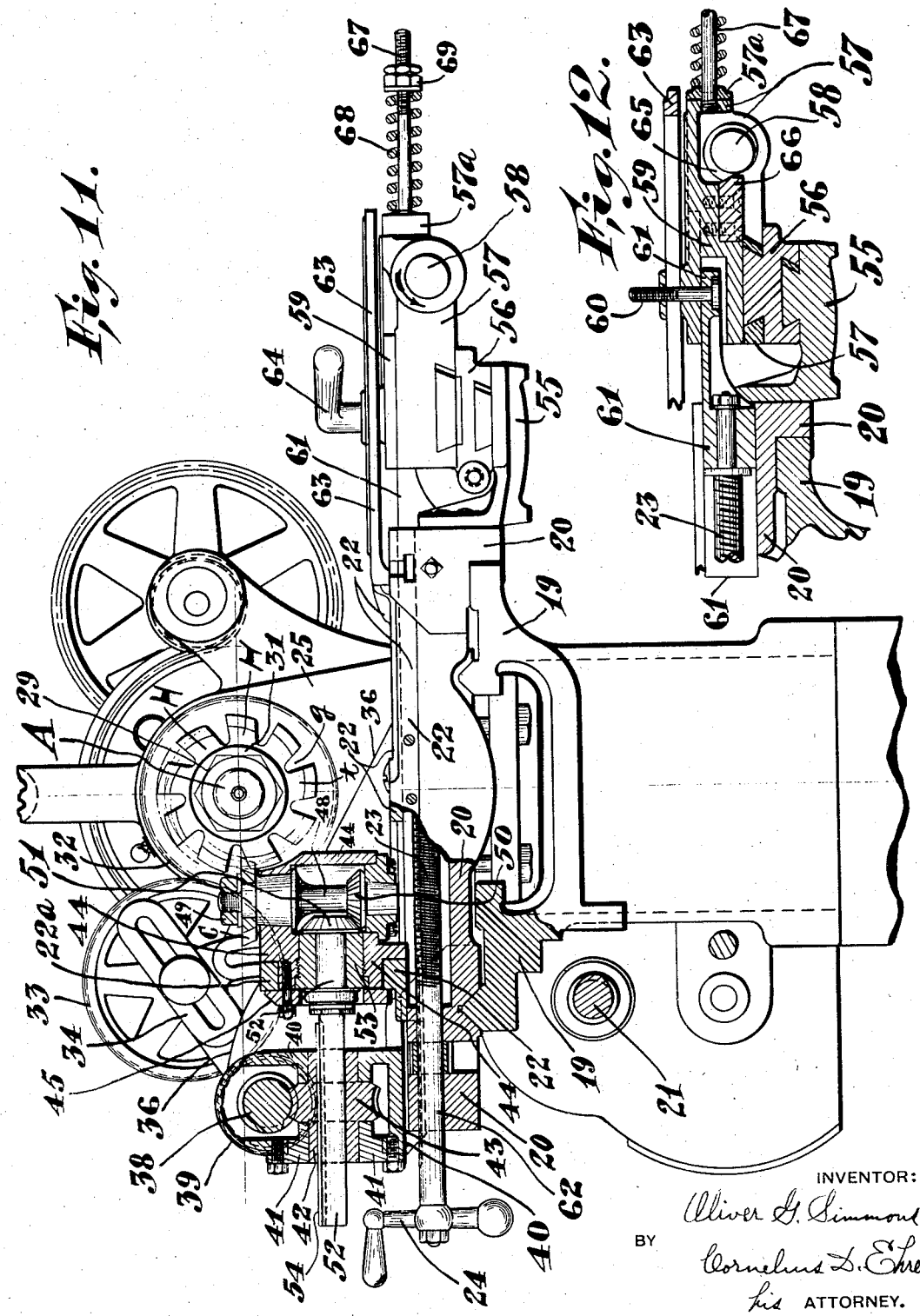

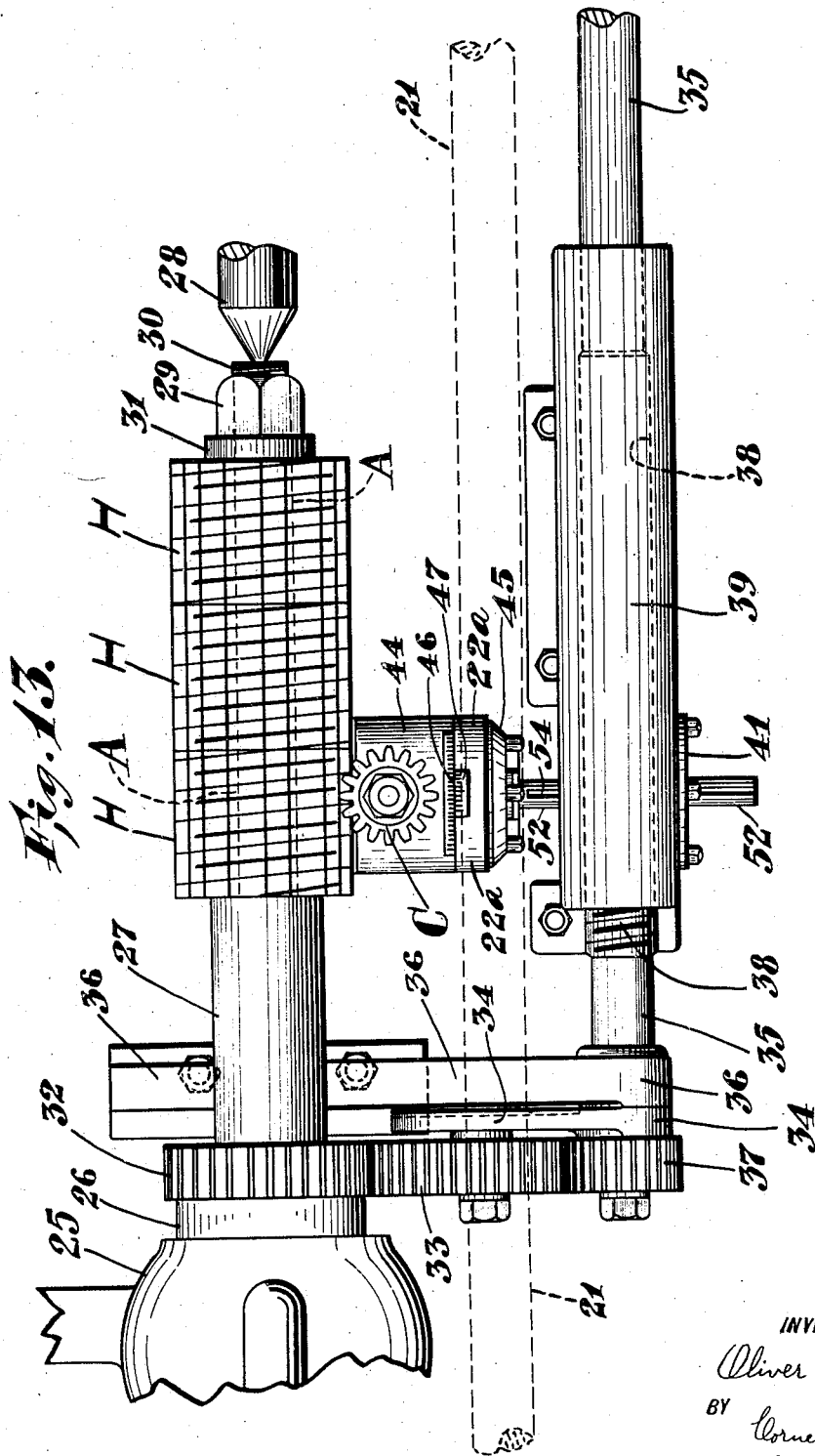

Patented Sept. 1, 1925.

1,551,705

UNITED STATES PATENT OFFICE.

OLIVER G. SIMMONS, OF PHILADELPHIA, PENNSYLVANIA, ASSIGNOR TO SIMMONS METHOD-HOB COMPANY, OF PHILADELPHIA, PENNSYLVANIA, A CORPORATION OF PENNSYLVANIA.

APPARATUS FOR GENERATING CONVOLUTE LINES IN HOBBING CUTTERS, SCREWS, AND WORMS.

Application filed July 29, 1921. Serial No. 488,305.

*To all whom it may concern:*

Be it known that I, OLIVER G. SIMMONS, a citizen of the United States, residing in the city and county of Philadelphia, State of Pennsylvania, have invented new and useful Improvements in Apparatus for Generating Convolute Lines in Hobbing Cutters, Screws, and Worms, of which the following is a specification.

My invention relates to apparatus for generating, on the molding principle, convolute lines or helical threads, single or multiple, of hobbing cutters and the like, such as worms, screws, taps, etc.; and more particularly, my invention resides in apparatus for so generating the convolute teeth of hobbing cutters, taps, etc., and simultaneously relieving them.

In accordance with my invention, the work or blank is rotated at suitable speed with respect to a cutter of one or more cutting elements or teeth, or having a circumferential series of cutting teeth, which cutter rotates upon an axis substantially at right angles to the axis of rotation of the work or blank in a plane which is at right angles or normal to the axis of rotation of the cutter, the axis of rotation of the cutter being, preferably, slightly adjusted out of such plane to bring the cutter teeth normal to the helix of the thread cut upon the work or blank; and the cutter and work or blank are moved with respect to each other longitudinally of or parallel to the axis of rotation of the work or blank, preferably by moving the cutter longitudinally of the blank at a rate of speed which bears or need bear no definite, fixed or predetermined relation to either the speed of rotation of the work or blank or the speed of rotation of the cutter, the cutter, however, for zero longitudinal speed, that is, when the cutter is at rest as regards movement longitudinally of the work or blank, being rotated at a speed bearing a fixed or predetermined relation to the speed of rotation of the work or blank; this speed of rotation of the cutter is varied, however, in accordance with the speed of relative longitudinal movement between cutter and work or blank, whereby the speed of rotation of the cutter varies with variation of speed of movement longitudinally of the work or blank. Accordingly, the speed of rotation of the cutter is differentially correlated to the speed of rotation of the work or blank, and bears no fixed or predetermined relation thereto.

In accordance with my invention, the cutter may be moved longitudinally with respect to the work or blank at any speed, high or low, and the speed of rotation of the cutter varies to suit the speed of longitudinal movement. In fact, the direction of rotation of the cutter may be actually reversed by suitably changing its speed of longitudinal movement with respect to the work or blank. Furthermore, the cutter may be withdrawn from cutting engagement with the work or blank, then moved longitudinally of the work or blank and again moved into cutting relation therewith, without danger of mutilation of or damage to the thread or partial thread theretofore cut. It is further of advantage in accordance with my invention that the thread need not be cut to full depth by a single longitudinal traverse of the work or blank by the cutter, but any number of successive cuts may be taken, and the cutter, for each successive cut, is brought into cutting relation with the work or blank without mutilation of or damage to the thread theretofore partially cut. This feature is of particular advantage in cutting hobs, taps or like cutters where near the completion of the threading operation it is desirable to take successive light cuts for purposes of final accuracy and high finish.

Reference should be had to the accompanying drawings forming a part of this specification in which—

Fig. 3 is a plan view of a cutter and worm or other threaded article of which the threads are of the same diameter.

Fig. 4 is a plan view of a hob and cutter which simultaneously generates and relieves the hob teeth.

Fig. 5 is a sectional view taken on the line 5—5 of Fig. 4.

Fig. 6 is a sectional view similar to Fig. 5 with the cutter and hob in different relative positions.

Fig. 7 is an end elevational view of a hob with a fragmentary section of the cutter, showing successive relief cuts, both by the outer tip and root of the cutter teeth.

Fig. 8 is an elevational view of a fragment of a gear in the process of cutting by the hob, the latter shown in section.

Fig. 9 is a view corresponding with Fig. 8, but illustrating different relative positions of gear and hob.

Fig. 10 is a simplified view of apparatus for carrying out my method.

Fig. 11 is an end elevational view, partly in vertical section, of a machine for practicing my method.

Fig. 12 is a fragmentary sectional view of part of the structure of Fig. 11.

Fig. 13 is a plan view, with parts omitted, of apparatus shown in Fig. 11.

Figure 1:
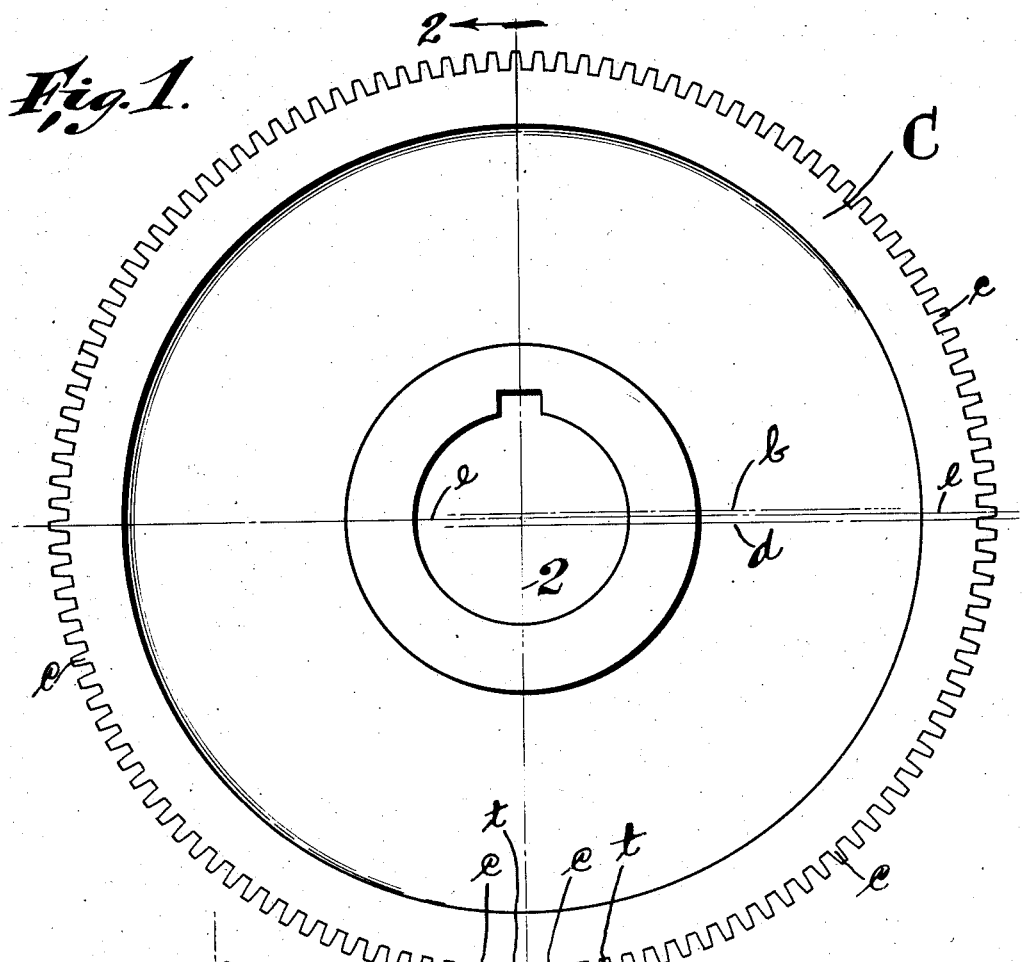
Fig. 1 shows a hob in section and the coacting cutter in plan view.
Figure 2:
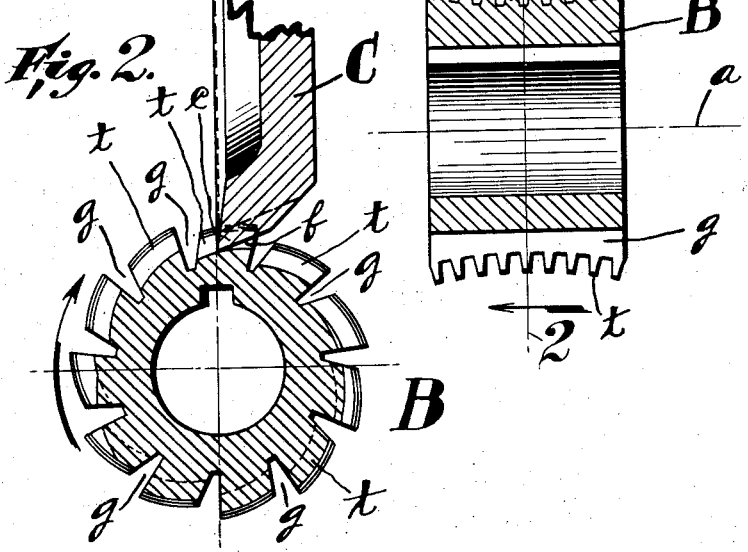
Fig. 2 is a sectional view on the line 2—2 of Fig. 1.

Referring to Figs. 1 and 2, C is a cutter, having the circumferential series of cutting teeth $c$ cutting a thread in the work or blank B, in this instance a hob having the flutes or gashes $g$ and the threads or teeth $t$. The blank B is rotated about its axis $a$ and the cutter C is rotated at a speed having a predetermined relation to the speed of rotation of the blank B, about an axis substantially at right angles to the axis $a$, and the cutter C is fed into or toward the blank B, thereby generating, on the molding principle, the threads or teeth $t$ on the blank B.

As shown in Fig. 2, the teeth $t$ on the blank or hob B are relieved or backed off, this being accomplished by slowly feeding the cutter C inwardly toward the axis $a$ of the blank B and quickly withdrawing it when the cutter reaches the rear faces of the teeth $t$ at a gash $g$ and again fed inwardly to begin a cut of both generation and relieving at the front faces of the teeth $t$. The lines $b$ and $d$, Fig. 1, indicate the extent of movement of the cutter C for relieving the teeth $t$, the actual cutting at the front faces of the teeth beginning when the axis of the cutter C is upon the line $e$. While this is the movement for relieving the teeth $t$, it will be understood that in addition the cutter C is fed toward the axis $a$ of the blank B to assure sufficient height of the teeth $t$ or depth between them. In this example, the cutter C has its axis upon the median line 2, which is midway between the ends of the blank B. Accordingly, the teeth $t$ on the blank B are disposed upon an arc, as indicated in Fig. 1, due to the fact that the cutter C is not moved longitudinally of the blank parallel to the axis $a$.

In this example the number of teeth of the cutter C is great, and sufficiently great to assure that the thickness of a cutter tooth $c$ as measured at the pitch circle is not materially different from the length of the chord of the arc of the pitch circle between opposite faces of a tooth $c$. For example, in a cutter having teeth approximately 135 in number, the chordal thickness of the cutter tooth is substantially the same as the thickness measured on the pitch circle, and the teeth of the cutter will correspond with the tooth elements of the corresponding gear, which will properly mesh with the teeth $t$ of the hob or worm B. Therefore a hob, as B, cut from a blank of the character referred to, will have teeth conjugate to the teeth of the cutter, and all gears having 135 teeth or less, cut by the hob, will be perfectly interchangeable.

In this regard it shall be understood, however, that my invention is not limited to so great a number of teeth, but that a cutter of the type described is preferred where the hob is, as indicated in Fig. 1, of the concave or Hindley worm type.

In the example illustrated, the helix angle of the teeth $t$ is relatively small, and in such case the axis about which the cutter C rotates may remain strictly or substantially at right angles to the axis $a$. In the case of coarser pitch, however, the helix angle becomes greater, and in such case, as hereinafter described, the axis of the cutter is preferably not maintained strictly at right angles with the axis $a$. Where the helix angle is small, as indicated, the clearance $f$, Fig. 2, on the cutter teeth $t$ is sufficient to prevent interference.

While in Fig. 2 the cutter C is not moved longitudinally of the blank B, in Fig. 3 the cutter rotates in the direction of the arrow 1, and is moved longitudinally in the direction of the arrow 3, while the blank or work B rotates in the direction of the arrow 4. In this case a Hindley worm or concave thread is not produced, but all the threads $t$ are of the same diameter. In this figure the cutter is shown as taking the last or finishing cut on the thread $t$ or as completing the thread to full depth by a single longitudinal movement with respect to the blank B. In this case also the teeth $c$ of the cutter generate, on the molding principle, the teeth or threads $t$, which are truly generated and conjugate to the teeth $c$ of the cutter C. It will be noted also that the cutter and blank have relatively smaller and greater diameters, respectively, than in Fig. 1, the number of teeth in the cutter C being relatively greatly less.

In Fig. 4 the work is a hob H having the flutes or gashes $g$ and threads or teeth $t$ generated on the molding principle by the cutter C rotating on an axis substantially at right angles to the axis of rotation of the hob H and moved longitudinally thereof. In this instance the cutter C rotates, is moved longitudinally of the hob H, and while rotating is reciprocated toward and away from the axis of rotation of the hub H for relieving its teeth, the relief movement itself corresponding with the distance between the lines *b* and *d*, while the line *h* represents a further degree of outward movement beyond that for the relief itself, for clearance purposes.

In Fig. 5 the cutter tooth *c* is shown as just beginning a cut at the front face of a tooth *t*, while Fig. 6 shows the position of cutter and hob in subsequent positions, the cutter C in the meantime having been fed inwardly from the line *b* to a position corresponding with the line *i* located at such position between the lines *b* and *d*, Fig. 4, as corresponds with the distance from the face of the tooth *t* that the face of the cutter tooth *c* has advanced. In both Figs. 5 and 6 the line *j* indicates what the periphery of the hob teeth would be if there were no relieving action.

Fig. 7 illustrates the production of relief in the hob teeth, the three outer curved lines *k* indicating successive relief cuts by the root portion *m* of the cutter C and the three curved lines *n* indicating corresponding successive relief cuts effected by the outer tip *o* of a tooth *c*, it being understood that the generation or molding of the teeth occurs simultaneously.

In Figs. 3 and 4 the helix angle of the threads or teeth *t* is substantial, and because of it the axis of rotation of the cutter C is not strictly at right angles to the axis of rotation of the blank B or hob H, but is tilted sufficiently to bring the plane of rotation of the cutter normal to the thread or tooth helix, and this is indicated in Figs. 3 and 4 by the double inner line *v* at the right of the bore in the cutters C, indicating that the planes of the cutters have been tilted to desired position.

Referring to Figs. 8 and 9, G represents a gear blank in the process of cutting or having teeth formed thereon by the hob H, the gear segment G of Fig. 9 representing that of Fig. 8 in a slightly advanced position as to rotation about its axis. As well understood in the art, the hob H rotates about an axis, horizontal in Figs. 8 and 9, at right angles to the axis of rotation of the gear blank G, the hob H being simultaneously moved across the periphery of the gear blank or parallel to its axis of rotation. In the example illustrated, the gear blank is of diameter greater than that desired for the finished ear, the original diameter of the gear blank being indicated by the circle *p*, while the diameter of the finished gear, that is, the diameter to the tips of the teeth *q*, being indicated in Fig. 9 by the circle *r*.

This diminution of diameter of the gear blank during cutting of the teeth *q* is effected by the cutting edge *s* between neighboring hob teeth *t*, the gear blanks in both Figs. 8 and 9 being shown as only partially cut across and as having the material between circles *r* and *p*, Fig. 9, removed by the cutting edge *s* which, as indicated, and preferred, is cylindrical or parallel to the axis of rotation of the hob H and effecting cylindrical contour of the outer ends of the gear teeth *q* concentric with the axis of the blank G. The cutting edge *s* is also indicated in Fig. 4.

It is also a feature of a hob in accordance with my invention that in the front or cutting face of a gash the entire contour of the teeth, crest, sides and root *s*, are all cutting edges, it being understood, however, that the cutting root or edge *s* does not come into operation unless the gear blank is oversized as to diameter.

The method of and apparatus for differentially correlating the speed of rotation of the cutter and of the work or blank will be understood by reference to Fig. 10, wherein the blank or work B is shown secured upon a shaft or arbor A rotated by any suitable means in the direction of the arrow 5. Rotating with the arbor A is the gear 6 driving the idler gear 7, which in turn drives the idler gear 8 secured upon the screw or worm shaft W, which rotates in the direction of the arrow 9 at a fixed or predetermined speed with respect to the speed of rotation of the blank B. The worm W meshes with and rotates the worm gear 10 secured upon the hollow shaft 11, longitudinally of and within which is movable the shaft 12 splined thereto by the key 13. Secured upon the shaft 12 is the bevel or mitre gear 14 meshing with and driving the bevel or mitre gear 15 secured upon the cutter shaft 16 to which is secured the cutter C by screw or equivalent means 17. The cutter rotates in the direction of the arrow 18 upon an axis which is substantially at right angles to the axis of rotation of the blank B and is tilted slightly out of the plane, which is normal to the axis of rotation of the blank B, to tilt the cutter to position normal to the threads to be cut, as referred to in connection with Figs. 3 and 4. The shafts 11 and 12, gears 14 and 15, shaft 16 and cutter C are supported by a carriage or equivalent, not shown, which may be moved by feed screw, or equivalent, longitudinally of the blank B parallel to its axis of rotation.

As the blank B rotates, the worm W rotates the gear 10 and through it the cutter C. With the cutter C at rest or stationary, as regards movement longitudinally of the axis of the blank B, the cutter C rotates at a predetermined or fixed speed with respect to the speed of rotation of the blank B, and if fed into the blank B will generate therein convolute lines or a thread, by molding action, the pitch of the thread cut in the blank B being determined by the relative speeds of rotation of the cutter and blank, and is equal to the circumferential pitch of the teeth c of the cutter C.

If, however, the cutter C be moved longitudinally of the blank B, parallel to the axis of rotation thereof, the gear wheel 10 will roll upon the worm W, as a pinion rolls upon a rack, and the gear 10 will be rotated by the worm W but at a speed different from that at which it is rotated if there is no longitudinal movement of the cutter C and gear 10. The speed of rotation of the cutter C is therefore dependent upon and varies with the speed of longitudinal movement of the cutter C parallel with the axis of the blank B, and the speed of rotation of the cutter is no longer fixed or predetermined as regards the speed of rotation of the blank B. The speed of rotation of the cutter C is different for every different speed of longitudinal movement, and because of the co-action between the worm W and gear 10, the latter being rotated though moving longitudinally of the worm W, the rate of rotation of the cutter C is differentially correlated to the speed of rotation of the blank B.

The above will become clear, it is believed upon consideration of the movements of the worm wheel 10 with respect to the worm W and the correlated movements of the cutter C with respect to the blank B. As long as the worm wheel remains in the same longitudinal position with respect to the worm, the wheel will rotate in exact ratio with the worm, this ratio being determined by the number of teeth on the worm wheel and the number of the helical threads on the worm. If the worm wheel is given a linear movement longitudinally of the worm while the worm is not rotating, it will have a rotary movement due to its longitudinal movement and the speed of rotation will be in exact ratio to the speed of longitudinal movement, this ratio being determined by the number of teeth on the worm wheel. If the worm wheel is given a linear movement longitudinally of the worm while the worm is rotating, the speed of rotation of the worm will be the resultant of the rotary movements due to the rotation of the worm and to the linear movement of the worm wheel with respect to the worm. If the two movements tending to rotate the worm wheel are equal and opposite, the worm wheel will not rotate but will have linear movement only and the direction of rotation of the worm wheel, when the rotary movement due to linear movement of the worm wheel is opposite that due to rotation of the worm, will depend upon which of the two opposed components is the greatest. The speed of rotation imparted to the worm wheel by the worm is directly proportional to the number of the threads thereof as well as to its speed of rotation. For instance by substituting a double thread worm twice the speed of rotation of the worm wheel may be obtained.

The cutter C is so geared to the worm wheel 10 that its speed of rotation is always at a fixed ratio with respect thereto. The blank B is geared to the worm W in such manner that its speed of rotation bears a fixed ratio to that of the worm. Assuming the cutter C to be a worm wheel and the blank B a worm, it is obvious that if the threads on the blank B were at the proper inclination and the cutter C provided with the proper number of teeth, the cutter C would always remain in perfect mesh with the threads on the blank B regardless of whether the worm wheel and cutter were held against linear movement or were moved longitudinally with respect to the blank and worm and regardless of the speed of such longitudinal movement. It will therefore be obvious that the cutter C will generate on the blank B helical threads, the inclination of which will depend solely upon the rate of rotation of the blank with respect to the worm and that each tooth of the cutter will engage exactly in the helical groove lines regardless of the speed of its linear movement.

Since the longitudinal movement of the cutter C causes the same pitch thread to be cut in the blank B as when the cutter C is stationary or at rest as regards longitudinal movement, by the structure shown, involving the worm W and gear 10, or equivalent, the speed of longitudinal movement of the cutter C may be anything, high or low, uniform or non-uniform, continuous or intermittent, and yet the same pitch thread will be generated in the blank B and without mutilation or deformation. It may even occur, with speed of longitudinal movement of the cutter C sufficiently great, that the direction of rotation of the cutter C may reverse, and yet continue to generate the thread in the blank B without damage thereto.

Accordingly, by the action described, during movement of the cutter C longitudinally of the work B, the rotation of the cutter and worm are differentially correlated, that is, the longitudinal motion of the cutter bears no particular or fixed or predetermined relation to the speed of rotation of the work, and the speed of rotation of the cutter varies with the speed of its longitudinal movement, and is therefore differentially, and not fixedly, correlated with the speed of rotation of the work.

By an arrangement such as described, it is not necessary to cut the thread to full depth by a single traverse of the blank B longitudinally thereof by the cutter C, but successive lesser cuts may be taken, the last cut or 'cuts being, if desired, light ones for effecting final thread form of highest accuracy and finish. Furthermore, the cutter C may be withdrawn from the blank B and moved longitudinally thereof to a different position and again returned to cutting relation, without necessity for trial or setting, and will be in proper position for continuing cutting of the thread without mutilation or deformation.

In the example illustrated, the pitch diameters of the gear 10 and cutter C are equal, and the numbers of teeth upon the gears 14 and 15 are equal. It will be understood, however, that my invention is not limited in this regard, since the pitch diameters of the gear 10 and cutter C may differ, in which case the numbers of teeth upon gears 14 and 15 may correspondingly differ. In the example illustrated, the cutter C has 25 teeth $c$ and makes one revolution for each revolution of the worm gear 10, when gears 14 and 15 have equal numbers of teeth, and the gear 10 makes one revolution for 25 revolutions of the worm W, which rotates at a speed equal to the speed of rotation of the blank B. These figures, it will be understood, are merely by way of example, and any suitable ratios may be employed; the worm W may rotate either faster or slower than the arbor A, and may, if desired, be caused to rotate in opposite direction from that indicated by employing, for example, a further idler intermediate the idler 7 and the gear 8.

In Figs. 11, 12 and 13 there is illustrated a form of apparatus corresponding with that of Fig. 10 and utilizable in carrying out my method.

There is illustrated a machine of the lathe type having the longitudinally extending bed 19. The carriage 20 is moved longitudinally of the bed 19 by any suitable means, as the feed screw 21, as well understood in lathe practice, the screw being driven by any suitable gearing of any desired ratio, without regard to speed of rotation of the work or blank. The cross slide 22 is movable on the carriage 20 transversely at right angles to the longitudinal extent of the bed 19 and may be so moved by the transverse feed screw 23, the handle 24 serving to rotate the screw 23 for such purpose, as well understood in lathe practice. In the lathe head 25 is rotatable a spindle 26, which may have a tapered socket receiving and rotating a correspondingly tapered end on the enlarged end 27 of the arbor A, whose other end is supported upon the lathe center 28 mounted as usual in the tail stock of the lathe. Upon the arbor A are disposed the hob blanks or other work pieces H, here indicated as three in number, fixedly secured on the arbor, and therefore rotating in fixed relation with the spindle 26, by the nut 29 threaded upon the threaded end 30 of the arbor A, a washer 31 intervening between the nut and one of the blanks for forcing them snugly against each other and against the shoulder or enlarged arbor end 27. Rotating with the spindle 26 is the gear 32, which drives the idler gear 33 carried by the arm 34 swingable or pivoted upon the worm shaft 35 extending parallel with the axis of the lathe and arbor A and supported in bearings carried in members secured to the lathe bed 19, one of said members 36 being shown in Figs. 11 and 13. Secured upon the worm shaft 35 is the gear or pinion 37 driven by the gear 32 through the idler 33, the worm shaft 35 therefore rotating at a speed which is fixed and predetermined with respect to the work or blanks H. Upon the shaft 35 is the worm or thread 38 disposed within a housing 39 carried by the fixed member 40 secured to the bed 19.

It is desirable that the gears 32 and 33 be readily replaceable by gears of different diameters so that the rate of rotation of the worm with respect to the blank may be changed. The gear 33 is therefore detachably secured in a slot $34^a$ which extends longitudinally of the arm 34, the arm 34 being pivoted on the shaft 35 can be swung to various angles with respect thereto and the slot $34^a$ permits the shaft of the gear wheel to be secured at the proper point along the length of the arm 34.

Secured to the member 40 is the member 41, within which and the member 40 are rotatable the hub journals 42 of the worm gear 43 rotated by the worm 38. Rotatable within the upstanding portion $22^a$ of the cross slide 22 is the cutter head 44, rotatable upon a horizontal transversely extending axis. Bolted to the cutter head 44 is the clamping member 45 for clamping the cutter head 44 in any adjusted position in fixed relation to the member $22^a$, the cutter head 44 and the member $22^a$ carrying, respectively, the index scales 46 and 47, Fig. 13. Rotatable in the cutter head 44 is the cutter shaft 48, whose upper end is threaded to receive the nut 49 which secures the cutter C in fixed relation upon the shaft 48, whose axis of rotation is substantially at right angles to the axis of the work or blank H, but which axis is adjustable by swinging toward the right or left, Fig. 13, by corresponding adjustment of the cutter head 44 with respect to member $22^a$, this adjustment effecting the hereinbefore described movement of the cutter to position at right angles to the thread to be cut upon the work or hob H. Secured upon the shaft 48 is the mitre gear 50 driven by the mitre gear 51 secured upon the shaft 52 having a bearing in the member 53 threaded into the cutter head 44. The shaft 52 carries a spline or key 54, the shaft extending freely through the bearing hubs 42 of the worm gear 43, and the key 54 sliding through a key way therein, whereby the gear 43 rotates the shaft 52 which, however, may be moved transversely with the cross slide 22.

As thus far described, the work or hob blanks H are rotated by the usual driving gearing of the lathe, and the worm gear 43 rotates at a predetermined speed, as determined by the ratio of the gears 32 and 37 and the number of teeth in the gear 43. The cutter C is rotated by the worm gear 43, but, as hereinbefore described, the speed of rotation of the cutter C with respect to the work H is not fixed or predetermined, but is dependent upon the longitudinal movement of the carriage 22 upon the bed 19, the speed of this carriage being made anything suitable or desirable by determining the ratio of the gears which rotate the feed screw 21. Furthermore, the carriage 20, when disconnected from the feed screw 21, may be moved, as by the usual hand wheel common in lathe practice, longitudinally of the bed 19, and yet the rotation of the gear C will always be such as to cut a thread of a predetermined pitch upon the blank H. The cutter C may be withdrawn from the work by operating the handle 24, then moved longitudinally of the work and then fed again into cutting relation therewith, and, as hereinbefore explained, will always be in proper position to continue cutting the thread without mutilation.

In case, however, the relief movement hereinbefore described is required, as in relieving the teeth of hobs, taps, etc., the cross slide 22 is slowly moved toward the right, Fig. 1, to feed the cutter C slowly into the work, and is quickly returned. This relief movement may be accomplished by any suitable relief attachment, one of which is illustrated in Figs. 11 and 12. Bolted to the lathe carriage 20 is the member 55, which carries the member 56, upon which is disposed the member 57, carrying the shaft 58 rotated in the direction of the arrow by gearing, not shown, at the head of the lathe. The shaft 58 makes one revolution per tooth $t$ or gash $g$ of the hob, tap or other work, and rotates at uniform speed which is fixed or predetermined with respect to the speed of rotation of the work or blank H. Slidable transversely, that is, to right and left as viewed in Figs. 11 and 12, is the member 59 attached by bolt 60 to the member 61, in which is journalled the right end of the transverse feed screw 23 which at its left end is journalled at 62 in the carriage 20. Attached to the cross slide 22 and extending over the member 59 is the member 63 having a longitudinal slot through which the bolt 60 extends. Threaded on the bolt 60 is the hand operated clamping nut 64, by which the member 63, and therefore the slide 22, is secured in any position to which adjusted by the screw 23 to the member 59, whereby the cross slide partakes of the transverse movements imparted to the member 59 by the cam 65 secured upon the shaft 58 and engaging the block 66, secured to the member 59. Secured to the member 59 is the bolt 67, which extends outwardly through the portion $57^a$ of the member 57. Surrounding the bolt 67 is the spring 68 confined between the member $57^a$ and the nut 69 threaded on bolt 67.

As the work H rotates, the cam engages the block 66, forcing the slide 22 and therefore the cutter C quickly toward the left when the cutter C reaches the gash at the back face of a tooth. The block 66 then rides upon the outer periphery of the cam, which allows the spring 68 to slowly return the slide 22, and therefore cutter C, toward the right during the relief cut.

Accordingly, the apparatus shown in Figs. 11, 12 and 13 corresponds with that hereinbefore described in connection with Fig. 10 in that the work or blank rotates at predetermined speed, and the cutter C is rotated at a speed which varies with the speed of longitudinal movement of the cutter C parallel with the axis of rotation of the blank H. And in addition the cutter is reciprocated transversely for relieving the teeth of a hob, tap or the like, which movement is periodic and strictly related to the speed of rotation of the work or blank. It therefore follows also that the rotation of the cutter is differentially correlated to the transverse movements of the cutter for relief cutting as well as differentially correlated to the speed of rotation of the work or blank, as H.

It will be understood respecting all the foregoing description that the cutter C may comprise any number of cutting elements or teeth $c$, from one up to a complete circumferential series, as illustrated and preferred. It will further be understood that the work may have generated therein either a single thread, as specifically described, or multiple threads, if desired, by simply suitably changing gears ratio, as well understood in the art.

This application is in part a continuation of my application Ser. No. 227,784, filed April 10, 1918, upon which Patent No. 1,426,680 was granted August 22, 1922.

What I claim is:

1. The combination with a bed, of a carriage movable longitudinally thereof, means on the bed for supporting and rotating a blank about an axis parallel to the direction of movement of said carriage, a cross slide on said carriage, a cutter on said slide rotatable about an axis substantially at right angles to the axis of rotation of said blank, a worm journaled on the bed and rotating in unison with the blank, said worm being parallel with the axis of rotation of said blank, a housing on the carriage enclosing the worm, a worm gear journaled in said housing and driven by said worm, and driving connections between the worm gear and cutter.

2. The combination with a bed, of a carriage movable longitudinally thereof, means on the bed for supporting and rotating a blank about an axis parallel to the direction of movement of said carriage, a cross slide on said carriage, a cutter on said slide rotatable about an axis substantially at right angles to the axis of rotation of said blank, a worm rotating in unison with the blank and parallel with the axis of rotation of said blank, a housing fixed to the carriage and enclosing the worm, a worm gear journaled within the housing and meshing with said worm and driving connections between the worm gear and cutter including a shaft carried by the slide and splined to said worm gear.

3. The combination with means for rotating a blank, of a cutter head, a support therefor movable transversely of the axis of rotation of the blank, a cutter carried by said head and rotatable about an axis substantially at right angles to the axis of rotation of the blank, said head being adjustable in said support to adjust the plane of rotation of the cutter to position the same normal to the thread cut thereby in the blank, and means on the cutter head and support to indicate the angular adjustment of the cutter.

4. The combination with a means for rotating the blank, of a cutter head, a support therefor movable longitudinally of the axis of rotation of the blank, a cutter carried by said head and rotatable about an axis substantially at right angles to the axis of rotation of the blank, said head being rotatable in said support about an axis at right angles to the axis of said blank and said cutter, and means on the cutter head and support to indicate the angular adjustment of the cutter.

5. The combination with means for rotating a blank, of a combined cutter head and gear housing, a support therefor movable transversely of the axis of rotation of the blank, said head being rotatably mounted on the support and adjustable about an axis substantially at right angles to the axis of the blank, a cutter shaft journaled in said head, a bevel gear on said shaft within the head, a driving shaft coaxial with the axis of rotation of the head and having a bevel gear thereon within the head meshing with the bevel gear on the cutter shaft.

6. The combination with means for rotating a blank, of a slide movable transversely of the axis of rotation of the blank, a bearing member carried by the slide, a cutter head having a portion journaled in the bearing member, a cutter shaft journaled in said head and disposed transversely of the axis of rotation of the head, a cutter on said shaft, means for driving said shaft, and means for clamping said head to the bearing in various adjusted positions, said head and bearing member having contiguous portions thereof provided with graduations to indicate the angular position of the cutter.

7. The combination with means for rotatably supporting a blank, of a rotatable cutter mounted for movement toward and from the blank, a shaft extending parallel with the axis of rotation of the blank and operatively connected to the cutter to drive the same, a gear driven from the blank rotating means, a gear on said shaft, an arm pivoted on said shaft and a gear detachably and adjustably mounted on said arm and meshing with the two first mentioned gears.

In testimony whereof I have hereunto affixed my signature this 20th day of July, 1921.

OLIVER G. SIMMONS.